United States Patent
Thompson

[15] 3,638,041

[45] Jan. 25, 1972

[54] SAMPLE AND HOLD TRIGGER CIRCUIT

[72] Inventor: James E. Thompson, Scottsdale, Ariz.

[73] Assignee: Motorola, Inc., Franklin Park, Ill.

[22] Filed: Dec. 2, 1970

[21] Appl. No.: 94,287

[52] U.S. Cl...............................307/247, 307/289, 307/238, 330/30 D

[51] Int. Cl...............................H03k 17/00

[58] Field of Search..................307/207, 289, 291, 247, 238; 330/30 D

[56] References Cited

UNITED STATES PATENTS

| | | | |
|---|---|---|---|
| 3,452,219 | 6/1969 | Duryee | 307/291 X |
| 3,446,989 | 5/1969 | Allen et al | 307/291 X |

*Primary Examiner*—Donald D. Forrer
*Assistant Examiner*—B. P. Davis
*Attorney*—Mueller and Aichele

[57] ABSTRACT

An integrated bistable trigger or comparator circuit normally is provided with operating current from a first current source, and the state of the trigger circuit is changed by a differential input circuit operated with a second current source providing a greater current than the first current source for altering the current drawn by the load resistors of the trigger stage to change its balance and thereby change its state. A third current source is connected to the trigger circuit in parallel with the first current source and is operative to draw a greater predetermined current than that provided by the second current source, so that when the third current source is operating, the input signals have no effect on the operation of the trigger circuit. A clock signal controlled switch is provided for disabling the third current source to permit the trigger circuit to be responsive to input signals.

11 Claims, 1 Drawing Figure

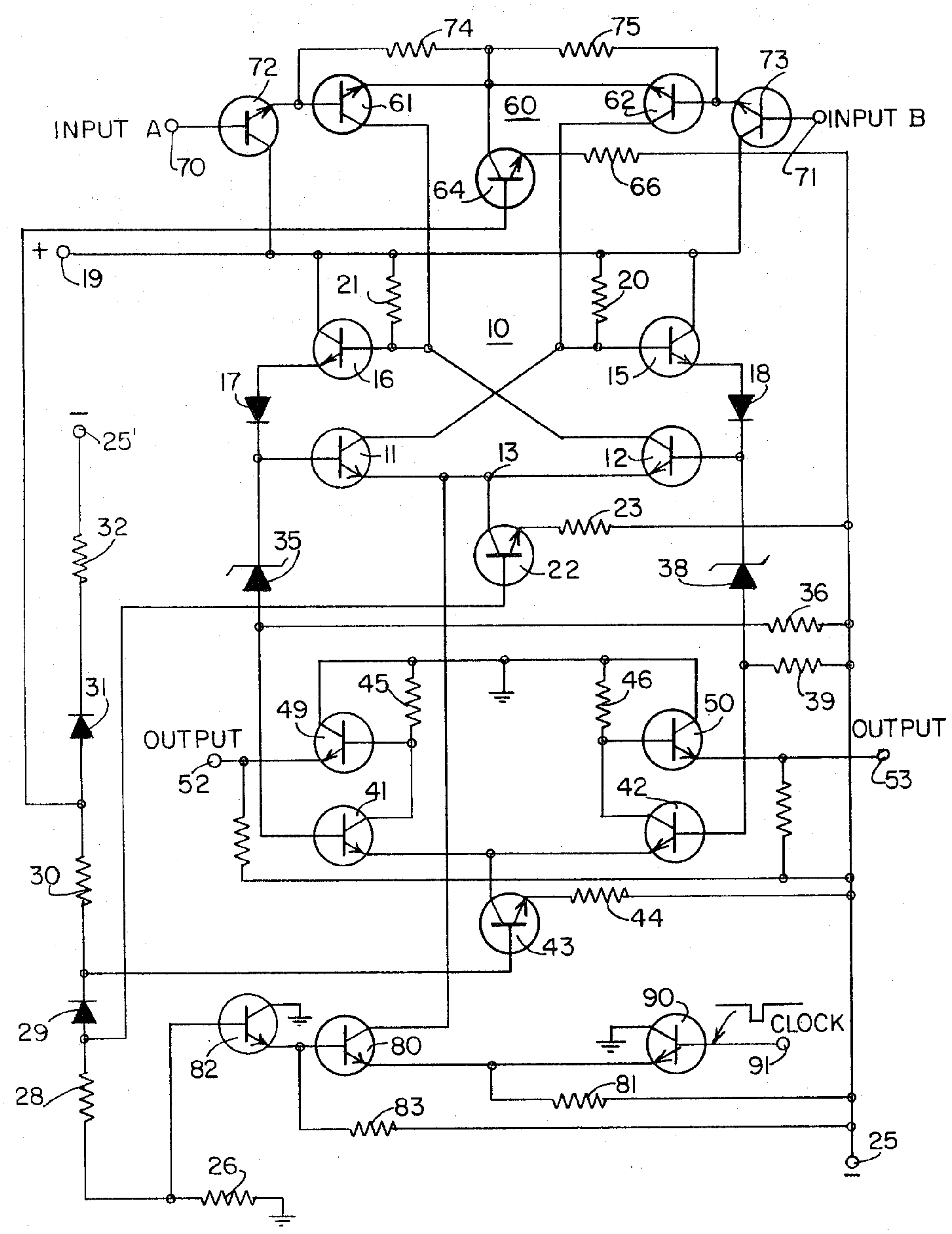
Inventor
JAMES E. THOMPSON
BY
Mueller & Aichele
ATTYS.

SAMPLE AND HOLD TRIGGER CIRCUIT

BACKGROUND OF THE INVENTION

A number of applications exist for a high-speed analog comparator capable of implementation in monolithic integrated circuit form for comparing two analog signals and providing an output indicative of the relative magnitude of these signals. In addition, it is desirable to hold the comparator output for a time interval sufficient to permit further processing by utilization circuits responsive to the output of the comparator circuit. During the period of time when such processing is taking place, it is desirable that the state of the comparator circuit does not change. In order to insure that such change only occurs when desired, it generally has been the practice to use an additional analog switch responsive to the output of the comparator to hold the output during processing, with the comparator being continuously responsive to the analog signals applied to the inputs.

Most conventional integrated circuit comparators which are presently available also have a 60- to 100-nanosecond delay for switching from one state to another following a change in the relative magnitudes of the input signals. It is desirable to reduce this delay as much as possible for a number of applications of analog comparators.

SUMMARY OF THE INVENTION

It is an object of this invention to provide an improved comparator or bistable circuit.

It is an additional object of this invention to provide an improved comparator circuit having a sample and hold operation.

In accordance with a preferred embodiment of this invention, a differential bistable trigger circuit includes first and second transistors with cross-coupled collectors and bases and emitters interconnected with a first current source providing operating current to the bistable circuit. Input signals for changing the state of the bistable circuit are obtained from an input switch circuit operated from a second current source, having a magnitude of current which is greater than the current supplied by the first current source to the differential bistable circuit. This input switch circuit is coupled to the collectors of the transistors in the bistable circuit to cause increased current to be drawn through load resistors connected to the collectors of the bistable circuit, thereby upsetting its balance and causing it to change state. In order to provide a sample and hold operation of the circuit, a third current source is connected in parallel with the first current source and draws current in excess of the current supplied by the input switch circuit; so that when the third current source is operative, the first and second transistors of the bistable stage remain set to the condition of conduction which they previously attained, irrespective of the condition of operation of the input switch circuit. The third current source is disabled to enable the first and second transistors of the bistable stage to be responsive to the input signals applied thereto from the input switch circuit.

By operating all of the transistors of the circuit in a current mode of operation so that none of the transistors are permitted to saturate, it is possible to reduce the delay or response time of the circuit to approximately 3 nanoseconds.

BRIEF DESCRIPTION OF THE DRAWING

The sole FIGURE of the drawing is a detailed schematic diagram of a preferred embodiment of the invention.

DETAILED DESCRIPTION

Referring now to the drawing, there is shown a sample and hold comparator circuit which preferably is implemented in monolithic integrated circuit form, with all of the components shown in the drawing being part of the same monolithic integrated circuit. Although the circuit is described in conjunction with the preferred embodiment as an integrated circuit, it should be noted that the circuit may also be realized in a discrete component form if so desired.

The heart of the comparator circuit is an emitter-coupled bistable trigger circuit 10, including a pair of NPN-transistors 11 and 12, the emitters of which are connected together at a first junction 13, and the collectors of which are connected to the bases of a pair of NPN-transistors 15 and 16, respectively. The transistors 15 and 16 constitute regenerative feedback elements in the circuit, with the emitter of the transistor 16 being coupled through a diode 17 to the base of the transistor 11, and the emitter of the transistor 15 being coupled through a corresponding diode 18 to the base of the transistor 12. Operating potential for the trigger circuit 10 is obtained from a source of positive potential (not shown) which may be coupled to a bonding pad 19 to which the collectors of the transistors 15 and 16 are directly coupled and to which the collectors of the transistors 11 and 12 are connected through a pair of load resistors 20 and 21, respectively.

Operating current for the trigger circuit 10 is provided by an NPN-current source transistor 22, the emitter of which is connected through a resistor 23 to a bonding pad 25, which may be connected with a source of negative potential (not shown). The base of the transistor 22 is connected to a voltage divider including resistors 26, 28, a diode 29, a resistor 30, a second diode 31, and a final resistor 32, all connected in series between ground and the negative bonding pad 25'.

It should be noted that in the drawing two negative bonding pads 25 and 25' are show; but in an actual realization of the circuit, the bonding pads labeled 25 and 25' are in fact a common bonding pad. The operating potential for the current source transistor 22 is obtained from the junction of the resistor 28 with the anode of the diode 29 and establishes a predetermined current to be drawn through the transistors 11 and 12.

For the purposes of illustrating the operation of the circuit shown in the drawing, assume that the potential applied to the bonding pad 19 is +5.2 volts, the potential applied to the bonding pad 25 is −5.2 volts, and the current source transistor 22 is biased to provide a 1-milliamp current flowing therethrough from the junction 13. In the absence of any other input signals, the circuit 10 will assume one or the other of its two stable states, with either the transistor 11 or 12 being rendered conductive and the other transistor being rendered nonconductive.

Assume that the transistor 11 is rendered conductive with the transistor 12 being rendered nonconductive. In this condition of operation, the transistor 11 is drawing the entire 1 milliamp of current pulled through the NPN-current source transistor 22; so that the potential on the base of the transistor 15 is approximately +5 volts while the potential on the base of the transistor 16 is +5.2 volts. Since the potential drop across a base-emitter junction of an integrated circuit transistor is approximately 0.7 volt, the potential on the emitter of the transistor 16 is +4.5 volts and the potential on the base of the transistor 11 is a 1-diode junction drop (0.7 volt) less or +3.8 volts.

Similarly the +5.0 volts on the base of the transistor 15 is dropped by the diode junction of the transistor 15 and the diode junction of the diode 18 to appear as +3.6 volts on the base of the transistor 12. Thus, with a more positive voltage on the base of the transistor 11, it is rendered and held conductive while the transistor 12 remains nonconductive.

On the other hand, if the transistor 12 were rendered conductive and the transistor 11 were rendered nonconductive, the voltages mentioned above would be reversed, with the higher voltage appearing on the base of the transistor 12 and the lower voltage appearing on the base of the transistor 11. In either of these stable states without any other circuit connections, the trigger circuit 10 will remain in such stable state indefinitely so long as power is applied to the circuit.

It should be noted that the potential appearing at the bases of the transistors 11 and 12 is obtained through voltage dividers, which for the transistor 11 include a Zener diode 35 connected between the junction of the diode 17 with the base of the transistor 11 in series with a resistor 36 to the bonding pad 25. Similarly, a Zener diode 38 is connected in series with a resistor 39 between the junction of the diode 18 with the base of the transistor 12 and the bonding pad 25. If symmetrical operation of the circuit is desired, the characteristics of the circuits between the emitters of the transistors 15 and 16 and the bonding pad 25 are the same; so that the Zener diodes 35 and 38 provide the same voltage drop thereacross and the resistors 36 and 39 are equal.

It should be noted that the transistors 15 and 16 both are always conducting by virtue of the load currents which pass through these transistors and the voltage divider circuits including the Zener diodes 35, 38 and the resistors 36 and 39. This results in a situation in which the voltages on the bases of the transistors 11 and 12 are always unbalanced with respect to one another, and this unbalance similarly is reflected as an unbalance between the voltages at the junction of the Zener diode 35 with the resistor 36 and the junction of the Zener diode 38 with the resistor 39; so that the difference between the voltages at these two junctions is the same as the difference between the voltages on the bases of the transistors 11 and 12.

This voltage or potential difference then may be utilized as an output from the circuit; and the junction of the Zener diode 35 and resistor 36 is connected to the base of a first differential amplifier NPN-output transistor 41, with the corresponding junction of the Zener diode 38 and resistor 39 being connected to the base of an NPN-output transistor 42, forming the other half of the differential output circuit with the transistor 41. The emitters of the transistors 41 and 42 are connected to the collector of an NPN-current source transistor 43, the emitter of which is connected through a resistor 44 to the negative bonding pad 25, and the base of which is provided with an operating potential from the junction between the diode 29 and the resistor 30.

Completion of the output circuit is provided by a pair of load resistors 45 and 46 connecting the collectors of the transistors 41 and 42, respectively, to ground. The output signals then present on the collectors of the transistors 41 and 42 are applied through a pair of emitter-follower NPN-transistors 49 and 50, the emitters of which provide the desired outputs on output terminals or bonding pads 52 and 53, respectively. These outputs are complementary outputs due to the operation of the differential stage 41 and 42; so that when the output appearing on the bonding pad 52 is high or near ground potential, the output on the bonding pad 53 is low or nearer the negative potential appearing on the bonding pad 25, and vice versa.

In the circuit which has been described thus far, the values of the collector resistors and the parameters of the current source transistors are such that none of the transistors are permitted to be driven to saturation, so that all of the transistors are operating in a current-mode type of operation.

To operate the circuit as an analog comparator, an input stage including a differential amplifier 60, having a pair of NPN-transistors 61 and 62 therein, is provided for controlling the state of the trigger circuit 10 to thereby establish the output state of the transistors 41 and 42. Current drawn by the transistors 61 and 62 is obtained through the resistors 21 and 20, respectively, from the positive bonding pad 19. As a result, any current drawn by the transistors 61 and 62 has an effect on the potential coupled by the transistors 15 and 16 to the bases of the transistors 12 and 11, respectively.

The current flowing through the transistors 61 and 62 is controlled by an NPN-current source transistor 64, the collector of which is connected to the junction of the emitters of the transistors 61 and 62, and the emitter of which is connected through a resistor 66 to the bonding pad 25. The base of the transistor 64 is provided with operating potential from the junction between the resistor 30 and the diode 31.

It should be noted that the potential applied to the base of the transistor 64 is more negative than the potential applied to the base of the transistor 22 which would appear to cause the transistor 22 to draw more current than the transistor 64. The relative values of the resistors 23 and 66, however, are selected such that the resistor 23 is substantially greater than the resistor 66, preferably an order of magnitude greater; so that the current provided by the current source transistor 64 is greater than that provided by the transistor 22. In the example under consideration with the transistor 22 providing 1 milliamp of current, the transistor 64 is biased to provide 2.8 milliamps of current for the differential amplifier 60.

Input signals to be compared by the circuit are applied to a pair of input terminals 70 and 71 which are connected, respectively, to the bases of a pair of NPN-transistors 72 and 73. The transistors 72 and 73 are in turn cascaded in a Darlington amplifier configuration to the bases of the transistors 61 and 62, with the collectors of the transistors 72 and 73 being connected to the positive bonding pad 19, and the emitters of these transistors being connected through high-impedance resistors 74 and 75, respectively, to the collector of the current source transistor 64. The Darlington input connection provided by the transistors 72 and 73 is used to raise the input impedance of the circuit.

The current drawn by the differential amplifier transistors 61 and 62 is not the full 2.8 milliamps of current provided by the current source transistor but is reduced by the amount of current flowing through the Darlington transistors 72 and 73. This latter current, however, is quite small compared with the current drawn by the transistors 61 and 62; so that it is of substantially no affect on the operation of the circuit.

Assume now that the potential of the signal applied to the input terminal 70 is more positive than the potential of the signal applied to the input terminal 71, so that the transistor 61 is rendered conductive and the transistor 62 is rendered nonconductive. When this occurs, an increased current is pulled from the source 19 through the resistor 21, causing a reduction in the potential on the base of the transistor 16. When this reduction becomes sufficient to cause the potential on the base of the transistor 11 to drop below that on the base of the transistor 12, the conductivity state of the trigger circuit 10 changes, with the transistor 12 rapidly being rendered conductive and the transistor 11 rapidly being rendered nonconductive due to the regenerative switching action caused by the transistors 15 and 16.

A similar change in state back to the original condition of operation occurs when the potential of the input signal on the base of the transistor 73 at the terminal 71 rises to a point where it equals the potential of the input signal on the base of the transistor 72 as applied to the input terminal 70. The emitter-coupled bistable trigger circuit 10 operates when these input potentials are equal, causing the transistors 61 and 62 to be equally conductive (i.e., everything is balanced in the input differential amplifier stage 60), the bistable trigger circuit 10 changes state. Thus, the previously conductive transistor 11 or 12 is rendered nonconductive, and the previously nonconductive transistor 11 or 12 is rendered conductive. Due to the fact that none of the transistors in any of the stages shown in the drawing is permitted to be driven to saturation, the switching time is very rapid; and in an actual circuit which has been operated, the switching delay is approximately a 3-nanosecond delay.

In the circuit which has been described thus far, the trigger circuit 10 changes state each time the relative magnitudes of the input signals applied to the terminals 70 and 71 become equal, i.e., when the magnitude of the potential applied to the input terminal 70 equals or exceeds that present on the terminal 71, the transistor 12 of the trigger circuit 10 is rendered conductive and the transistor 11 is rendered nonconductive. Similarly, when the potential applied to the input terminal 71 is equal to or greater than the potential appearing in the input terminal 70, the transistor 11 is rendered conductive and the transistor 12 of the trigger circuit 10 is rendered nonconductive.

The trigger circuit 10 does not need to be precisely balanced in order to provide this snap-action switching. The voltage difference on the bases of the transistors 11 and 12 must be only slightly less than 0.1 volt for the transistors 11 and 12 both to be active, at which time the positive feedback provided by the transistors 15 and 16 insures the regeneration necessary to switch the circuit from one state to another.

In many applications for a comparator circuit of the type which has been described thus far it is necessary to insure that the outputs do not change during predetermined time intervals when utilization circuitry is caused to be responsive to the output from the comparator circuit. Inasmuch as the analog input signals applied to the terminals 70 and 71 may change their relative magnitudes at any time, thereby causing a change in the state of the trigger circuit 10 it is desirable to implement a "sample and hold" operation for the circuit; so that once a sample has been effected, it may be held by the comparator circuit until the processing of the output from the circuit has been completed. After such processing has been completed, the circuit then can be returned to a state where it is responsive to signals on the input terminals 70 and 71.

In order to provide for this type of "sample and hold" operation, an additional NPN-current source transistor 80 has been provided, with the collector of the transistor 80 connected to the junction 13 of the emitters of the transistors 11 and 12 and the emitter of the transistor 80 being connected through an emitter resistor 81 to the negative bonding pad 25. Biasing potential for the current source transistor 80 is provided through a voltage divider including an NPN-emitter-follower reference transistor 82, the collector of which is connected to ground and the emitter of which is connected through a resistor 83 to the negative bonding pad 25. The base of the transistor 82 is provided with the potential appearing between the resistors 26 and 28 in the voltage divider described previously, so that a relatively high biasing potential is applied to the base of the transistor 80. In addition, the resistor 81 is of lower resistance than the resistor 23 connected to the emitter of the current transistor 22; so that when the current source transistor 80 is conductive, the current drawn thereby and provided to the differential transistors 11 and 12 in the trigger circuit 10 is substantially in excess of the 1 milliamp of current provided by the current source transistor 22.

The current source transistor provides sufficient current to the circuit 10 to overcome the effects of the current provided through the input stage 60 by the current source 64. Thus, irrespective of the condition or state of operation of the input differential amplifier stage 60, the trigger circuit 10 remains set to the state which it previously attained whenever the current source transistor 80 is operative or conductive. For example, if the current source transistor 80 is caused to draw 4 milliamps of current, the potential difference provided at the bases at the transistors 11 and 12 by the conductive one of the transistors 11 or 12 is increased over the difference previously described to the point that the 2.8 milliamps of current available from the input stage 60 cannot cause a balancing of the Schmitt trigger stage 10. This prevents the trigger circuit 10 from being responsive to signals obtained from the input stage 60.

It is apparent, however, that if the transistor 80 were to be allowed to remain conductive throughout the operation of the circuit, the circuit would lock up in one or the other of its stable states and would remain so indefinitely. As a consequence, it is necessary to provide means for controlling the operation of the current source transistor 80; so that it is rendered conductive only when it is desired to lock the bistable trigger stage 10 in one or the other of its stable states. To accomplish this control operation, an NPN-control transistor 90 is provided, with the emitter coupled in common with the emitter of the transistor 80 to the resistor 81. The collector of the transistor 90 is connected to ground, and the base is provided with clock signals applied to a clock input terminal 91.

Normally the input to the base of the transistor 90, appearing on the input terminal 91, is a high input sufficient to render the transistor 90 conductive. When the transistor 90 is conductive, near ground potential is applied to the emitter of the transistor 80, rendering it nonconductive. The operation of the remainder of the circuit then is as described previously, with the trigger circuit 10 changing states in response to changes of the relative magnitudes of the input signals applied to the input terminals 70 and 71.

Periodically, during the time intervals when processing of the output signals appearing on the bonding pads 52 and 53 is desired, a negative or low clock signal input is provided to the base of the transistor 90, causing it to be rendered nonconductive. When this happens, the transistor 80 is rendered conductive, pulling current through the trigger circuit 10 which is too large for the input stage 60 to upset. As a consequence, the bistable trigger circuit 10 is locked to the state which it attained just prior to the time when the low clock signal is applied to the terminal 91. The duration of the low clock signal is selected to be as long as necessary for processing the output signals from the comparator circuit. When such processing is completed, the clock signal is removed causing the transistor 90 once again to be rendered conductive. This in turn causes the transistor 80 to be rendered nonconductive, so that the comparator circuit then may resume operation in a normal manner.

By providing the additional current source 80 and the clocked operation thereof, it is possible to provide a sample and hold type of operation for the comparator circuit without the necessity of using additional analog switches or further bistable output stages. Of course, the clock signals applied to the terminal 91 must be synchronized with the timing of the utilization circuit with which the comparator shown in the drawing is to be used.

The hysteresis of operation of the comparator circuit in response to the input signals on the terminals 70 and 71 may be adjusted by adjusting the relative magnitudes of the currents provided by the current source transistors 22 and 64.

What is claimed is:

1. A bistable trigger circuit including in combination:
first and second voltage supply terminals adapted to be connected across a source of operating potential;
at least first and second transistor means each having control, first and second output electrodes, with the second output electrodes being coupled together at a first junction;
first and second impedance means coupled between the first output electrodes of said first and second transistor means, respectively, and said first voltage supply terminal;
means for coupling the first output electrode of said first transistor means with the control electrode of said second transistor means;
means for coupling the first output electrode of said second transistor means with the control electrode of said first transistor means;
first current source means providing a first predetermined current connected between the first junction and said second voltage supply terminal; and
second current source means connected between the first junction and said second voltage supply terminal for providing a second predetermined current higher than the first predetermined current provided by said first current source means; and
means for disabling said second current source means.

2. A sample and store circuit including in combination:
bistable trigger circuit means including first and second transistors each having control, first, and second output electrodes with first output electrode of said first transistor being coupled with the control electrode of said second transistor and the first output electrode of said second transistor being coupled with the control electrode of said first transistor;
first and second voltage supply terminals adapted for connection across a supply of operating potential;

first and second impedance means interconnecting said first voltage supply terminal with the first output electrodes of said first and second transistors at first and second junctions, respectively;

first current source means providing a current of predetermined magnitude coupled between a third junction interconnecting the second output electrodes of said first and second transistors and said second voltage supply terminal;

input circuit means coupled with the first and second junctions for supplying additional current to the first and second junctions to change the state of operation of said bistable trigger circuit means; and second current source means coupled between the third junction and said second voltage supply terminal for providing a predetermined current in excess of the current provided by said first current source means and of a magnitude sufficient to swamp out the effects of operation of said input circuit means; and means for disabling said second current source means.

3. The combination according to claim 2 wherein said input circuit means operates to cause at least momentarily a change in the relative potentials on the control electrodes of said first and second transistors causing said bistable trigger circuit means to be changed from a first state of operation, with said first transistor being conductive and said second transistor being nonconductive, to a second state of operation with said second transistor being conductive and said first transistor being nonconductive and vice versa and wherein the magnitude of the current provided by said second current source is such that sufficient current flows through the one of said first and second transistors which is conductive at any given time to cause the potential at the corresponding first and second junctions to be sufficient to overcome the effects of changes in potential caused by said input circuit means.

4. The combination according to claim 3 wherein the means for disabling said second current source means includes means for rendering said second current source means substantially nonconductive.

5. A sample and hold comparator circuit including in combination:

a bistable trigger stage including first and second transistors, each having control, first and second output electrodes, with the first output electrode of the first transistor being coupled with the control electrode of the second transistor and the first output electrode of the second transistor being coupled with the control electrode of the first transistor;

first and second voltage supply terminals adapted to be connected across a source of operating potential;

first and second impedance means coupled between said first voltage supply terminal and the first output electrodes of said first and second transistors at first and second junctions, respectively;

first current source means providing a predetermined magnitude of current coupled between said second voltage supply terminal and the second output electrodes of the first and second transistors interconnected at a third junction;

second current source means providing a current of a magnitude at least as great as the magnitude of current supplied by said first current source means;

input switch means having an input and first and second outputs and operable to connect said input with either of said first and second outputs;

means coupling the input of said input switch means with said second current source;

means coupling the first output of said input switch means with the first junction and the second output of the input switch means with the second junction;

third current source means coupled between the third junction and said second voltage supply terminal for providing a predetermined current in excess of the current provided by the second current source means; and means for disabling the third current source means for a predetermined period of time.

6. The combination according to claim 5 wherein said bistable trigger stage is a first differential circuit, wherein the control, first, and second output electrodes of said first and second transistors correspond to base, collector, and emitter electrodes, respectively, and wherein said input circuit means includes a differential switch including third and fourth transistors each having base, collector, and emitter electrodes, with the base electrodes of said third and fourth transistors being responsive to input switching signals, the emitter electrodes of said third and fourth transistors being coupled at a fourth junction to the second current source means, and the collector electrodes of said third and fourth transistors being coupled with the first and second junctions respectively, all of said transistors being operated in a current mode of operation.

7. The combination according to claim 5 wherein said first, second and third current source means each include transistors having base, collector, and emitter electrodes, with the base electrodes of said first, second and third current source transistors being provided with predetermined operating potentials, the collector of said first current source transistor being coupled with the input of said input switch means, the collectors of said second and third current source transistors being connected with the third junction, and the emitters of all of said current source transistors being coupled with said second voltage supply terminal.

8. The combination according to claim 7 further including a control transistor having base, collector, and emitter electrodes, means for supplying the base electrode of said control transistor with clock signals for rendering said control transistor conductive and nonconductive accordingly; means for coupling the collector electrode of the control transistor with a point of reference potential, and means coupling the emitter electrode of the control transistor with the emitter electrode of the third current source transistor, the third current source transistor being rendered nonconductive when the control transistor is rendered conductive.

9. The combination according to claim 7 further including first and second voltage divider means; fourth and fifth transistors each having base, collector, and emitter electrodes, with the base of said fifth transistor being connected to the first junction, the collector of said fifth transistor being connected with said first voltage supply terminal, and the emitter of said fifth transistor being through said first voltage divider means to said second voltage supply terminal; the base of said sixth transistor being connected to the second junction, the collector of said sixth transistor being connected with said first voltage supply terminal, and the emitter of said sixth transistor being connected through said second voltage divider means to said second voltage supply terminal; and means coupling the bases of said first and second transistors to corresponding points on said first and second voltage divider means, respectively.

10. The combination according to claim 9 wherein all of said transistors are of the same conductivity type.

11. The combination according to claim 10 wherein said first and second voltage divider means each includes first diode means, poled in the forward current conducting direction between the emitters of said fifth and sixth transistors and the bases of said first and second transistors, respectively, and Zener diode means and resistance means connected in series between the bases of said first and second transistors, respectively, and said second voltage supply terminal, with said Zener diode means and said resistance means of said first voltage divider being connected together at a first output junction, and said Zener diode means and said resistance means of said second voltage divider being connected together at a second output junction for providing output potentials from said bistable trigger stage for utilization.

* * * * *